United States Patent
Schmittmann

Patent Number: 5,394,643
Date of Patent: Mar. 7, 1995

[54] FUMIGANT FLUID

[75] Inventor: Hans-Bernd Schmittmann, Velbert, Germany

[73] Assignee: Proteco AG, Switzerland

[21] Appl. No.: 148,524

[22] Filed: Nov. 5, 1993

Related U.S. Application Data

[63] Continuation-in-part of Ser. No. 857,411, Mar. 25, 1992, abandoned.

[51] Int. Cl.⁶ ............................................. A01M 13/00
[52] U.S. Cl. ............................................................ 43/124
[58] Field of Search ............................ 43/124, 132.1, 125, 43/144

[56] References Cited

U.S. PATENT DOCUMENTS

| | | | |
|---|---|---|---|
| 3,876,372 | 4/1975 | Van Uchelen et al. | 43/124 |
| 4,597,217 | 7/1986 | Narita | 43/124 |
| 4,637,161 | 1/1987 | Turner | 43/132.1 |
| 4,768,306 | 9/1988 | Hilbun | 43/132.1 |
| 4,829,706 | 5/1989 | Perry | 43/125 |
| 4,833,818 | 5/1989 | Berta | 43/124 |
| 4,889,708 | 12/1989 | Latif et al. | 43/132.1 |
| 5,027,546 | 7/1991 | Tallon | 43/132.1 |

*Primary Examiner*—P. Austin Bradley
*Assistant Examiner*—Chuck Y. Mah
*Attorney, Agent, or Firm*—Amster, Rothstein & Ebenstein

[57] ABSTRACT

A process for the destruction of nest-building, tunnel digging, and other ground animal pests, includes the step of providing a container containing carbon dioxide, wherein the carbon dioxide is in a liquid form under high pressure. Very cold carbon dioxide gas from the container is introduced into the nest, tunnel or ground via a conduit, thereby to form carbon dioxide snow in the nest, tunnel or ground. The carbon dioxide snow is permitted to sublimate slowly over time, thereby to form carbon dioxide gas in situ and at low pressure in the nest, tunnel or ground at a depth below that of the air in the immediate vicinity of the pests so that the carbon dioxide drives such air upwardly at least partially from such depth into other areas of the nests, tunnels or the atmosphere above the ground so that substantially all of the pests rapidly suffocate.

1 Claim, 1 Drawing Sheet

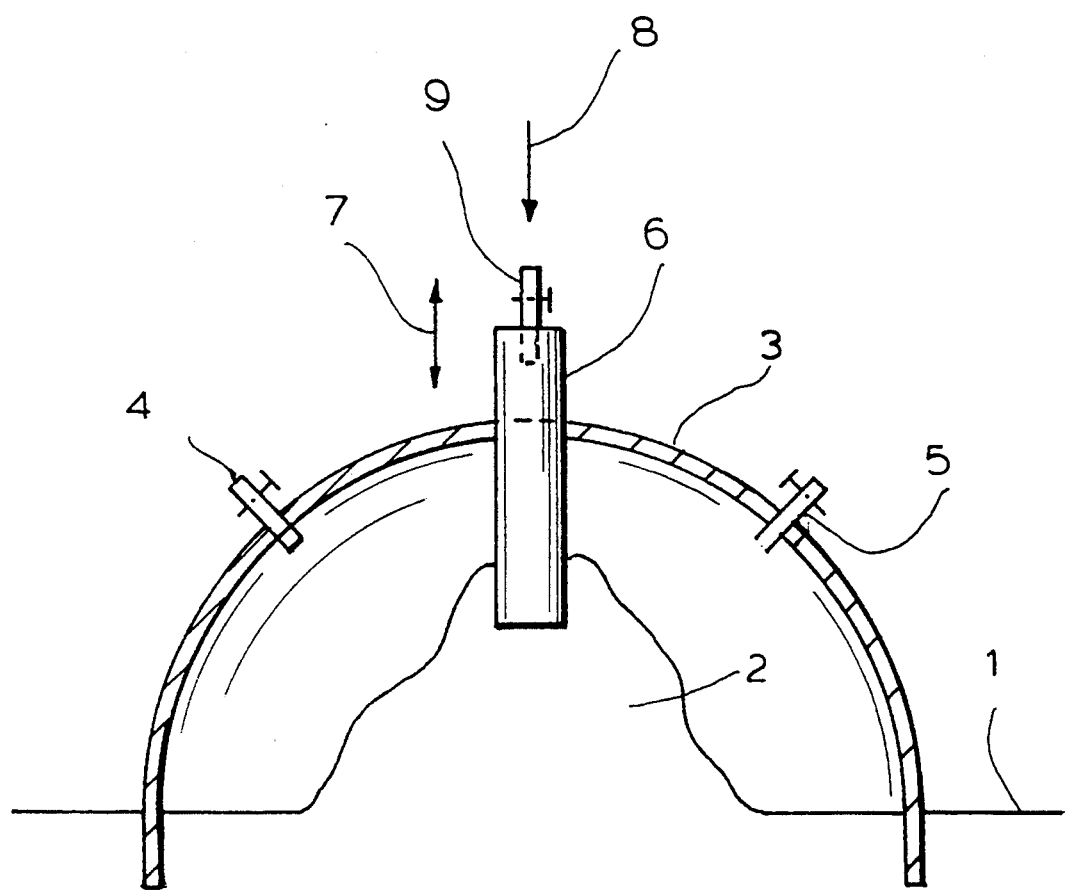

FUMIGANT FLUID

This is a continuation-in-part of application Ser. No. 07/857,411, filed on Mar. 25, 1992, now abandoned.

BACKGROUND OF THE INVENTION

The invention relates to a process and devices to destroy animal pests, especially insects, for example ants, termites, roaches, wasps, house beetles, or the like, as well as rats, mice, moles, or the like.

An agent for destroying insects, such as ants, termites, roaches, wasps, house beetles, etc. is known from DE-A-37 12 487. It is nonpoisonous and is harmless to humans and domestic animals. The agent is intended to be eaten by insects, thus reaching the digestive tract. The agent carbon dioxide is evolved in the digestive tract, as a result of which the insects die. An admixed aromatic material is intended to attract certain insect species. The known agent mainly consists of yeast, baking powder, sodium, bicarbonate, or similar gas-evolving materials. A disadvantageous feature is that the known agent attracts other pests, for example mice or rats, which can eat the agent without injury. In addition, the agent is not free from residues, but instead lies strewn on the ground, if it is not completely eaten up.

EP-A-0 247 555 relates to the preparation of a disinfestation agent containing an inert fluid and phosphine, obtained by hydrolysis of a water-replacing metal phosphide, especially intended for the gassing of grain silos, in order to destroy pests such as insects, as well as rodents, present in stores of such plant-origin foods. The intention is that of keeping a certain phosphine concentration constant for a rather long time, allowing carbon dioxide in a concentration range of several percent by volume as synergist for the phosphine, whereby the killing of insects is accelerated in time, and a reduction in the phosphine concentration becomes possible. Solid or liquid carbon dioxide, ice water, or water and metal phosphide are reacted in a pressure vessel to prepare the disinfestation agent. When the reaction ends, the disinfestation agent is drawn off through a relief valve as a gaseous mixture of carbon dioxide and phosphine. The known disinfestation agent is toxic and dangerous to handle, because of the phosphine. The action of a certain quantity of phosphine is increased by the presence of carbon dioxide. The agent acts as a poison.

In addition, many other toxic agents are known, to be used at certain concentrations. All toxic agents have many drawbacks.

SUMMARY OF THE INVENTION

The object of the invention is that of developing a process free from toxic agents for the destruction of animal pests, which is harmless to humans and the environment, and moreover can be executed with simple means at low cost.

This object is achieved according to the invention by impairing the respiration of the pests, by reducing the normal oxygen supply in the vicinity of the pests to such an extent that the pests rapidly suffocate. This is attained within the framework of the invention by mixing or at least partly expelled the normal atmosphere in the vicinity of the pests with an inert gas. Gases or gas mixtures are preferably used as inert gases which are heavier than atmospheric air, such as nitrogen and/or argon and/or carbon dioxide. The use of carbon dioxide is preferred. With the use of carbon dioxide, it is for example sufficient to replace about 30% of the air by volume by carbon dioxide in admixture. It is especially advantageous to have a layer beneath air in a more or less closed space, where the pests are in or under the carbon dioxide layer and are surrounded by carbon dioxide. It may also be advantageous, however, to expel all the air from a closed space if the pests have spread throughout the space. In such cases, almost no further oxygen is at all available to the pests.

BRIEF DESCRIPTION OF THE DRAWING

The FIGURE is a schematic illustration of the apparatus of the present invention and the method of using the same.

It is known that carbon dioxide is a colorless, nonflammable odorless gas which can readily be liquefied to form a colorless very mobile liquid (for example, at 20° C. and 55.4 bar or at −78.5° C. and normal pressure). It is on the market in bottles in liquid form. On removal under reduced pressure, a part of the liquid carbon dioxide becomes gaseous so rapidly that coldness due to evaporation develops, and the part not removed can be cooled down to about −80° C., whereby solid carbon dioxide snow forms. Solid carbon dioxide is on the market as dry ice. Carbon dioxide gas is a stable unreactive gas. It is a component of the atmosphere. Carbon dioxide is not actually toxic, and it may be present in the human body circulation in relatively large quantities (e.g., 50 to 60 set by volume in venous blood). It can exert a suffocating effect in humans in larger quantities by expelling oxygen. Humans tolerate up to 2.5% carbon dioxide on breathing it for hours; 8 to 10% induces headache, dizziness, rise in blood pressure, and excitement conditions. More than 10% leads to unconsciousness, spasms, and circulatory weakness. More than 15% induces paralysis. Very high concentrations rapidly lead to death.

The action of carbon dioxide on the animal pests to be controlled according to the present invention is not known. Knowledge about the effect on humans has not hitherto provided any stimulation toward the present invention. The harmful effect on humans who must handle carbon dioxide in combatting pests has perhaps been a deterrent against the use of carbon dioxide. It was found in connection with the invention, however, that it is possible to achieve a nontoxic destruction of pests with carbon dioxide if its use is controlled so that humans do not come in contact with injurious quantities, and quantities are used which, after expulsion and replacement of a certain minimum quantity of atmospheric air, lead to the rapid death of the pests by suffocation. The present invention according describes a completely new way. Whereas until now chemical poisonings with gases, contact poisons, or agents migrating through the digestive tract were used, whereby the poisons were usually individualized, i.e., intended for certain animal species or the growth condition or life section of certain animal species, because other animal species reacted differently or not at all, the present invention teaches expulsion or replacement of air by gases, whereby the gases or gas-air mixtures lead to dilution of oxygen and thereby to suffocation of the pests. The process of the invention can be applied to all pests living by breathing above water in any life stage.

Carbon dioxide is introduced in gaseous form into a closed space, for example, and a corresponding quantity of air is thereby expelled. The carbon dioxide settles as a layer at the floor of the space. The pests located in the layer suffocate rapidly. The carbon dioxide is then again removed by suction with a suitable device, is purified, and is reused for the same purpose. However, it can simply also be removed from the closed space into the outside atmosphere, i.e., blown into the outside air, where it mixes in a dilution such that no harmful effect on humans results. Since the carbon dioxide to be used can be obtained from air by the Linde process, the ecological balance is not altered by the process of the invention.

A bell or hood-shaped device is suitably used for specially limited use in a space or in the open, which is placed over the site to be treated, for example an ant or termite hill. Certain quantities of either carbon dioxide gas and/or carbon dioxide liquid and/or carbon dioxide snow are introduced through suitable inlet openings, and if applicable air is removed from an outlet unit. After a time of action of several minutes, for example, the gas or gas mixture is pumped out or discharged into the open. The time of action is empirically determined according to the pest species. It is advantageous to use hollow bodies of hood or bell shape made of transparent material, e.g., plexiglass, so that the effect of the process of the invention can be directly observed and optimally limited in time.

The use of the described hollow body open below presents the advantage that the inert gas introduced can also penetrate into cracks and tunnels located beneath the hollow body, for example as found in the ground or a flooring. It was found that there was also an expulsion of air to a considerable depth in the ground beneath the hollow body, as well as into ground tunnels branching out to the side beyond the end of the hollow body, so that pests located in cracks, tunnels, or in a closed space beneath the flooring were also reached.

The inlet device is advantageously a gastight pipe penetration through the surface of the hood and which can be pressed into the earth. The inert gas can be conducted below the earth surface through this pipe. The pipe is advantageously conducted adjustably to the hood so that, for example, it can be shoved into the hill in case of an anthill. According to a special form of execution of the invention, the inert gas is introduced with excess pressure. Suitable devices are provided for this purposes. The excess pressure causes compression of gas into the tunnels and cavities, thus making certain that the inert gas reaches insects in these cavities and tunnels.

It is also advantageous to provide a gas turbulence unit in the space of the hollow body, for example a fan, to permanently maintain gas circulation during the treatment.

The use of liquid carbon dioxide proved especially favorable in cases in which the pests were located in cracks, tunnels, caves, or similar hollow areas beneath the surface covered by the hollow body. The liquid, from which carbon dioxide gas is generated, which acts as described, has a very low temperature of $-78°$ C., for example. The liquid penetrates into the cavities and produces low temperatures, at which the pests are also killed by undercooling. An additional effect is thereby produced. This is also the case if carbon dioxide snow is used, when the snow temperature acts on pests in a similar way.

The process of the invention does not leave any traces behind, especially no toxic traces. If handled carefully and in a controlled way, it also does not represent any danger to humans. Moreover, the process is harmless to the environment and ecology.

The process of the invention has been used, for example, to control the rapid spread of fire ants in public buildings, schools, and playgrounds. For this purpose, a plexiglass hood open below, equipped with a gas inlet unit, gas outlet unit, and handle, was placed in the open over an ant nest, with the edge of the hood pressed a little into the earth, so that the cutoff to the earth was almost gastight. Carbon dioxide gas was then passed into the hood, and air was withdrawn from the hood, whereby the carbon dioxide gas formed a layer beneath the air. The gas was unable to escape to the outside below the hood edge pressed into the earth, but the gas penetrated the tunnels below the ground and also displaced air from there. It was found that the ants were immobilized immediately after the carbon dioxide filling. All ants on the surface were dead when the hood was removed after five minutes. Digging in the ground then revealed that there were no longer any living ants. This treatment was conducted at nine other places where there were ant nests. The treated sites were inspected after one hour, on the following day, and after one week. A continuing ant activity was found in only one case. Further investigations showed that the nest area was not completely covered by the hood in this case, so that several ants survived in the uncovered area. Repetition of the process of the invention with a hood of suitable size then led to the desired result.

The process of the invention was then applied in the same way to roaches and to aphids located on leaves. The same result was obtained.

In another example, liquid carbon dioxide was shaken into a hood with edges pressed into the ground over an ant next. On lifting the hood after about five minutes, all ants at the surface were dead and made stiff and brittle by cold, so that it was possible to rub them to powder. The liquid had flowed into tunnels and cavities in the ground and achieved the same result there. Moreover, the earth area in the vicinity of the liquid was frozen. This condition persisted for some time. Use of carbon dioxide snow in the same way had a greater surface effect, but it was about as effective.

The process of the invention was also successfully conducted, for example, in a closed container in which plants of various species were transported. The plants were attacked by various insects, such as various beetles and aphids, located on leaves, roots, in root areas in the earth, and within the plant body. Carbon dioxide gas at 30% by volume, for example, was introduced into the container. The gas mixture was pumped out and replaced by air after two hours. Inspection revealed that all insects were dead. The plants had not suffered any kind of injury. A 12-hour experiment gave the same result, as did experiments with rodents. It was moreover found that the plants were "fresh" for a longer time, i.e., they did not wither or die as rapidly, in comparison with the same plants transported in a container not loaded with carbon dioxide.

The invention accordingly provides a new process whereby all insect species as well as other harmful creatures can be destroyed without harming the environment by diluting oxygen in the atmosphere by certain quantities up to complete expulsion in the vicinity of the pests. The process of the invention can advantageously be conducted under hollow bodies open below, such as hoods, or in closed containers, whereby these devices are suitably equipped with gas forwarding units. It is especially conducted in containers containing plants, vegetables, or fruit. The containers are suitably equipped with a gas-production unit obtaining carbon dioxide from air by the Linde process. In addition, a valve device may be provided, to make it possible to introduce gas under excess pressure into the container.

The process of the invention is also successfully applied to wood in which insects such as termites are located, because the carbon dioxide also expels oxygen from the cavities of the wood, whereby insects located in the hollows are suffocated. It is also possible to control moles or the like living in cavities in the ground with the process of the invention.

It is advantageous to be able to recover carbon dioxide for closed containers, for example, with units in sufficient quantity. For example, a container can be equipped with a suitable installed circulation and recovery unit capable of storing carbon dioxide, pressing it into the container, removing it from the container, and purifying it and again storing it. However, units obtaining carbon dioxide from the outside air, introducing it into the container, and pumping it out of the container into the outside air may also be used.

Another special advantage of the invention is that pests are unable to develop any resistance, for example by means of the immune system, as is the case for most contact poisons, for example.

The invention is illustrated in greater detail by means of the drawing. Soil 1 is shown, on which anthill 2 is located. Anthill 2 is covered by hood 3, presenting gas inlet unit 4 and gas outlet unit 5. Riser 6 can also be used instead of or in combination with inlet unit 4. It is gas-tight and adjustable in double-arrow direction 7 in the hood surface. Riser 6 is pushed beneath the soil surface or, as represented, pushed into the anthill, after which inert gas is introduced into the riser in arrow direction 8. Riser 8 also presents gas inlet unit 9, with which gas, possibly under pressure, can be introduced.

In a preferred embodiment of the present invention, the carbon dioxide gas is formed in situ and at low pressure in the nest, tunnel or ground from carbon dioxide snow. This is accomplished by introducing carbon dioxide liquid into the nest, tunnel or ground via a conduit from a container, thereby to form carbon dioxide snow in the nest, tunnel or ground. Then the carbon dioxide snow is given time to absorb heat from its environment and thereby sublimate into carbon dioxide gas in situ and at low pressure in the nest, tunnel or ground. Surprisingly, the distribution of the carbon dioxide gas thus produced is more effective for the purposes of the present invention, presumably because the gas is produced below the level of the air and at low pressure.

More particularly, the carbon dioxide is passed from a carbon dioxide container (where it present in the liquid phase under high pressure) through a conduit into a nest or tunnel. The carbon dioxide liquid will expand very quickly upon release from the container so that sub-sublimation takes place, resulting in the production of carbon dioxide snow. As this sub-sublimation process results in the absorption of much heat from the surroundings of the lower end of the conduit (i.e., the nest or tunnel), the temperature in the surroundings of the lower end of the conduit lowers dramatically. In point of fact, this sharply reduced temperature may kill or immobilize some of the pests in the soil, but this is not the purpose thereof. The true purpose is that the carbon dioxide snow will over time slowly sublimate in situ and at low pressure into carbon dioxide gas as it absorbs additional heat from the environment.

This sublimation process is so time consuming (due to the limited heat present in the nest, tunnels or underground environment) that the carbon dioxide gas being produced has sufficient time to spread into the tunnels and caverns of the nest with almost no pressure driving it therethrough. Instead, the carbon dioxide gas flows, almost like water, under the air and therefore reaches the furthest reaches of the tunnels and caverns. By way of contrast, if the carbon dioxide gas were under pressure (e.g., introduced as a pressurized gas), it would be pushed quickly through only the larger tunnels and caverns and might result in air pockets being created which would shield the pests from the carbon dioxide.

It is claimed:

1. A process for the destruction of nest-building, tunnel digging, and other ground animal pests, comprising the steps of:
   (A) providing a container containing carbon dioxide, wherein the carbon dioxide is in a liquid form under high pressure;
   (B) introducing very cold carbon dioxide gas from the container into the nest, tunnel or ground via a conduit, thereby to form carbon dioxide snow in the nest, tunnel or ground; and
   (C) permitting the carbon dioxide snow to sublimate slowly over time, thereby to form carbon dioxide gas in situ and at low pressure in the nest, tunnel or ground at a depth below that of the air in the immediate vicinity of the pests so that the carbon dioxide drives such air upwardly at least partially from such depth into other areas of the nests, tunnels or the atmosphere above the ground so that substantially all of the pests rapidly suffocate.

* * * * *